(12) United States Patent
Sattmann

(10) Patent No.: US 8,161,772 B2
(45) Date of Patent: Apr. 24, 2012

(54) METHOD FOR THE PRODUCTION OF AN OPTICAL COMPONENT MADE FROM QUARTZ GLASS

(75) Inventor: Ralph Sattmann, Aschaffenburg (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 922 days.

(21) Appl. No.: 11/629,227

(22) PCT Filed: Jun. 8, 2005

(86) PCT No.: PCT/EP2005/006144
§ 371 (c)(1),
(2), (4) Date: Dec. 11, 2006

(87) PCT Pub. No.: WO2005/121037
PCT Pub. Date: Dec. 22, 2005

(65) Prior Publication Data
US 2008/0028797 A1 Feb. 7, 2008

(30) Foreign Application Priority Data
Jun. 11, 2004 (DE) .......................... 10 2004 028 258

(51) Int. Cl.
*C03B 37/15* (2006.01)
(52) U.S. Cl. ........................................................ 65/412
(58) Field of Classification Search ............... 65/412
See application file for complete search history.

(56) References Cited

U.S. PATENT DOCUMENTS

| | | | | |
|---|---|---|---|---|
| 4,195,980 A * | 4/1980 | Sterling et al. | ............ | 65/392 |
| 4,812,154 A * | 3/1989 | Yoshida et al. | ............ | 65/412 |
| 4,820,322 A * | 4/1989 | Baumgart et al. | ............ | 65/412 |
| 5,221,307 A * | 6/1993 | Takagi et al. | ............ | 65/403 |
| 6,173,588 B1 * | 1/2001 | Berkey et al. | ............ | 65/407 |
| 6,279,353 B1 | 8/2001 | Wada et al. | | |
| 6,460,378 B1 | 10/2002 | Dong et al. | | |
| 2001/0009104 A1 | 7/2001 | Wada et al. | | |

(Continued)

FOREIGN PATENT DOCUMENTS

EP    1129999 A2 *    9/2001

(Continued)

OTHER PUBLICATIONS

Patent Abstracts of Japan, English language abstract for JP 2004 035404, Feb. 5, 2004.

(Continued)

*Primary Examiner* — Queenie Dehghan
(74) *Attorney, Agent, or Firm* — Tiajoloff & Kelly LLP

(57) ABSTRACT

In a conventional method for the production of an optical component made from quartz glass, a coaxial arrangement with a core rod, surrounded by a quartz glass envelope tube comprising an evacuable inner drilling, is introduced in the vertical direction into a heating zone, softened therein by sections and, with formation of a drawing bulb, elongated to give the quartz glass component. According to the invention, a simple and cheap method based on the above, permitting the production of high-grade optical components by elongation of a coaxial arrangement of core rod and an enveloping tube with great economy, may be achieved, whereby a core rod is used, comprising at least two separate core rods arranged one above the other in the inner drilling and the weight of an upper core rod section is taken by a mounting or support region of the enveloping tube, provided above the drawing bulb.

19 Claims, 5 Drawing Sheets

U.S. PATENT DOCUMENTS

Figure 1:
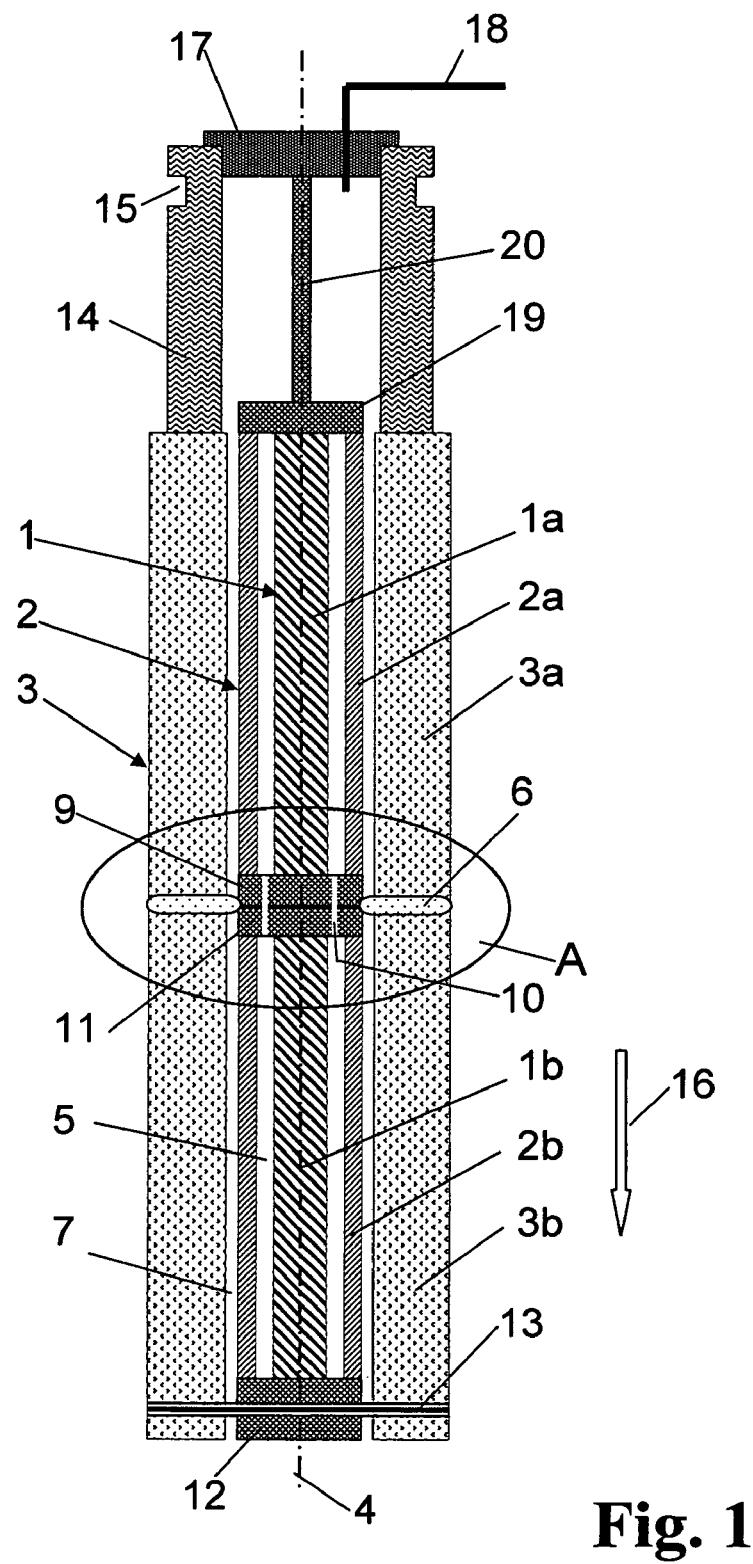

2004/0163421 A1     8/2004    Wada et al.
2006/0174659 A1*   8/2006    Ganz et al. ..................... 65/412

FOREIGN PATENT DOCUMENTS

| | | |
|---|---|---|
| GB | 2244269 | 11/1991 |
| JP | 52121334 | 10/1977 |
| JP | 62059547 A * | 3/1987 |
| JP | 2004 035404 | 2/2004 |

OTHER PUBLICATIONS

Patent Abstracts of Japan, English language abstract for JP 52121334, Oct. 12, 1977.

Espacenet English language abstract for JP 2004 035404, Feb. 5, 2004.

Espacenet English language abstract for JP 52121334, Oct. 12, 1977.

* cited by examiner

METHOD FOR THE PRODUCTION OF AN OPTICAL COMPONENT MADE FROM QUARTZ GLASS

The present invention relates to a method for producing an optical component made from quartz glass in that a coaxial arrangement which comprises a core rod surrounded by a quartz-glass cladding tube having an evacuable inner bore is supplied in vertical orientation to a heating zone, heated therein zonewise and, with formation of a drawing bulb, elongated to obtain the quartz glass component.

Optical components either in the form of intermediate products (preforms or simple solid cylinders) for an optical fiber, or also directly the end product itself in the form of the optical fiber, are produced by collapsing and elongating a coaxial arrangement consisting of quartz glass core rod and an outer cladding tube of quartz glass surrounding the core rod.

U.S. Pat. No. 6,460,378 B1 discloses a method of the above-mentioned type. In this method a core rod is simultaneously overclad with an inner cladding tube and an outer cladding tube in a vertical arrangement in an elongation process. The core rod is fused at its upper end with a holder of quartz glass. For the fixation of the core rod in the inner bore of the outer cladding tube, the cladding tube is provided in the area of its lower end with a constricted portion. The constricted portion serves as a support for a holding ring which in the vertically oriented condition of the outer cladding tube is introduced from above into the inner bore of the cladding tube. The holding ring has an outer diameter smaller than the inner diameter of the outer cladding tube, but slightly larger than the inner diameter of the constricted portion, so that the holding ring comes to rest from above on the area of the constricted portion. Part of the conically shaped lower end of the core rod extends through the central bore of the holding ring, so that the holding ring forms a central fixation and an axial stop for the core rod. Moreover, the first inner cladding tube rests at the front side on the holding ring.

The quartz glass components which are fixed relative to one another by means of the holding ring are then fused to each other at their upper ends, a vacuum being generated and maintained in the inner bore of the outer cladding tube. To this end a quartz glass ring is needed for sealing the gap between the inner and outer cladding tube, the quartz glass ring also helping to fix the components relative to one another in the upper region of the arrangement. An additional heating process step is needed for fusing the upper component ends; it is here hardly possible to correct ensuing deviations from the desired geometry at a later time.

The reproducible production of an optical high-quality component requires considerable efforts with respect to manufacture and time in this procedure for ensuring an exact coaxial arrangement and fixation of core rod and cladding tubes relative to one another prior to the elongation process.

It has however been found that a fixed guiding and mounting of the upper core rod end during the elongation process makes it more difficult to observe the desired geometry of the component to be drawn off. A mounting which enables the upper core rod end to move to a certain extent permits a self-centering during the elongation process, such self-centering entailing an improved dimensional stability of the component to be produced. One drawback in this procedure is however that the core rod which is loosely arranged in the inner bore presses downwards during the elongation process due to its weight and deforms the softened quartz glass mass of the drawing bulb or even breaks through said mass. Moreover, due to the downwardly pressing core rod, there is a relative enrichment of core rod material as compared with jacket material, which leads to a change in the so-called "b/a ratio" (ratio of jacket diameter to core diameter). This is a particularly important parameter of optical fibers and preforms, in the case of which only a very small deviation from the desired value can be tolerated as a rule.

Although the application of a negative pressure in the inner bore of the cladding tube can counteract a sagging of the core rod, there arises a maximum pressure difference with respect to the pressure in the inner bore of 1 bar when an atmospheric pressure is externally applied to the drawing bulb. In dependence upon the specific weight of the core rod material and the concrete shape of the drawing bulb, core rods having a length of more than about 3 m cannot be safely held any longer by means of the maximum pressure difference of 1 bar. For improving the economy of the manufacturing method, the use of longer core rods is however aimed at.

It is therefore the object of the present invention to provide a simple and inexpensive method which permits manufacture of high-quality optical components with great economy by elongation of a coaxial arrangement consisting of a core rod and a cladding tube.

Starting from the above-mentioned method, this object is achieved according to the invention in that a core rod is used consisting of at least two core rod sections loosely arranged one on top of the other in the inner bore, the weight of an upper core rod section being carried in a holding or supporting portion of the cladding tube provided above the drawing bulb.

The method of the invention is characterized by the following aspects:

1. To be able to use a core rod that is as long as possible without any significant deformations of the drawing bulb and changes in the "b/a ratio", two measures are indispensable. On the one hand, a longitudinally divided core rod is used. Said rod consists of at least two segments (core rod sections) arranged one on top of the other in the inner bore section, between which a gap can remain. It is thereby possible to carry the weight of at least one upper core rod section at a place other than the drawing bulb, namely on the cladding tube. To this end the cladding tube comprises a holding or supporting portion above the drawing bulb. On the supporting portion, the upper core rod section is supported either directly or indirectly, or it is suspended from the holding portion directly or indirectly.

The core rod is divided into longitudinal sections. The lower core rod section therefore requires a fixation of its own for preventing any falling out from the inner bore of the cladding tube, starting from the beginning of the elongation process.

The length of the individual core rod sections is dimensioned such that their weight can even be held safely due to the negative pressure produced in the inner bore if the respective holding or supporting portion has melted in the course of the elongation process. Additional advantages are achieved by the core rod being segmented. On the one hand, shorter core rod segments can be produced more easily and economically than larger ones, it is also possible to use selected remaining pieces, and in consideration of unavoidable deviations from the ideal cylinder symmetry and dimensional tolerances the insertion of shorter core rod sections into a cladding tube is easier and thus permits the observance of a smaller gap.

Since part of the core rod weight is carried on the cladding tube, the arrangement that is composed of core rod and cladding tube may be on the whole in the method of the invention several times the length that can be realized in the prior art at the most.

2. Moreover, the core rod is loosely arranged in the inner bore of the cladding tube. This means that the core rod sections are tiltable or pivotable to some extent or are laterally movable, such movement permitting a self-centering during the elongation process.

In the coaxial arrangement, the core rod is surrounded by a jacket tube or a plurality of jacket tubes. The cladding tube is that jacket tube on which the weight of the upper core rod section is carried in the end, i.e. the tube comprising the holding or supporting portion within the meaning of the invention. The cladding tube surrounds the core rod directly, or one or several further jacket tubes are positioned between the cladding tube and the core rod. It is essential that the cladding tube does not rest with its weight on the drawing bulb.

The core rod is arranged inside the inner bore of the cladding tube. The inner bore is evacuable, the place of connection for the vacuum device being of no relevance to the success of the teaching according to the invention, and it may thus also be situated outside the inner bore of the cladding tube.

The upper core rod section within the meaning of the invention is a core rod section which has a weight carried on the holding or supporting portion of the cladding tube, and which is positioned above a further lower core rod section. This is the uppermost core rod section of the core rod or a core rod section arranged below the uppermost core rod section.

The method of the invention permits a reproducible manufacture of dimensionally stable optical components (rod, preform, fiber) having a comparatively high yield by using core rods and cladding tubes of a large length.

In a first preferred variant of the method, the upper core rod section is suspended from the holding or supporting portion.

The suspended holding makes it easier to observe a predetermined position of the upper core rod section in the inner bore. The holding or supporting portion is normally arranged in such a case on the upper end of the upper core rod section, so that it maintains its holding function for a long period of time while the coaxial arrangement is zonewise melted.

Preferably, the upper core rod section is provided at its upper end with an outer collar positioned on the upper face of the cladding tube.

The holding or supporting portion is formed by the upper face of the cladding tube, the upper core rod section being supported indirectly via other components or directly on the upper face of the cladding tube. The upper core rod section is here provided with an outer collar which grips over the face of the cladding tube. To ensure application and maintenance of a negative pressure in the inner bore, particularly in the annular gap between the core rod and the cladding tube, the outer collar advantageously comprises gas passage openings.

As an alternative, and equally preferred, a holding body which is supported in the wall of the cladding tube engages the upper end of the upper core rod section.

The holding body is fused with the upper end of the upper core rod section, it is embedded therein, or it extends through a bore of the core rod section. It is important that it is supported on the cladding tube. In the simplest case it is a quartz glass pin which extends through the cladding tube wall and through the core rod.

Both variants of the method require no or only a few measures for the hot deformation of the upper core rod section or the cladding tube. The formation of a bore for the passage of a quartz glass pin can take place in the cold state (without hot deformation). The upper core rod section can also maintain a certain freedom of movement permitting a self-centering during elongation.

As an alternative or supplement to a suspended mounting, it has also turned out to be advantageous when the upper core rod section is supported on the holding or supporting portion.

A weak point in the case of a suspended mounting is the mechanical strength of the upper end in the core rod section to be held. With a supported mounting, breakage of the upper core rod section is ruled out.

It has turned out to be useful when the holding or supporting portion is configured in the form of a necking of the inner bore of the cladding tube, the upper core rod section resting directly or indirectly on the necking of the inner bore.

The cladding tube is made of one piece, or it is composed of two or more cladding tube sections. It is essential that at least one necking of the inner bore of the cladding tube is provided. The necking serves as a holding or supporting portion within the meaning of the invention. It is configured such that an upper core rod section rests thereon either directly or indirectly via other components arranged in the inner bore of the cladding tube. Therefore, the weight of the upper core rod section is carried via the necking on the cladding tube, so that the weight does not act on the drawing bulb evolving during elongation. The necking is e.g. achieved through a step-like or conical taper of the inner bore or by means of a support body projecting through the cladding tube wall into the inner bore. The lower core rod section, or part thereof, extends underneath the necking.

In the area of the necking, the core rod is divided into an upper and a lower core rod section. While the upper core rod section is supported on the necking, the necking may simultaneously serve as an abutment for the lower core rod section to prevent floating, as will be explained in more detail further below.

A variant of the method has turned out to be particularly useful in which the necking is configured as a surrounding inner bead of the cladding tube.

A surrounding inner bead is particularly stable mechanically and prevents slipping of the core rod section resting thereon directly or indirectly. Problems regarding tightness of the inner bore do not exist.

Moreover, an inner bead can be formed in a particularly easy way, especially when, like in a preferred variant of the method, the cladding tube is produced by butt welding of tubular sections, and the necking is simultaneously formed (preferably as an inner bead) during welding in the area of the joint.

In a particularly preferred variant of the method, the upper core rod section rests on a lower core rod section directly or indirectly, the weight of the lower core rod section being carried on the holding or supporting portion.

In this case the holding and supporting section simultaneously serves to mount or hold the lower core rod section and the upper core rod section, which reduces the manufacturing costs. The upper core rod section rests on the lower core rod section directly or indirectly and need not be treated in a special way for this.

It has turned out to be particularly advantageous when the lower core rod section is suspended from the holding or supporting portion.

The holding or supporting portion is for instance configured in the form of an upper face of the cladding tube which is gripped over by an outer collar of the lower core rod section, or the lower core rod section is suspended from a support body which extends through the wall of the cladding tube and which engages the upper end of the lower core rod section.

During zonewise softening of the arrangement during the elongation process, said portion will only soften at a point of time at which the lower core rod section is short and the remaining weight of the lower core rod section is thus low. It is important that the upper core rod section can rest on the lower core rod section without the weight of the two complete core rod sections weighing upon the drawing bulb.

In the case of an upper core rod section arranged loosely in the inner bore of the cladding tube, "floating" may occur during the elongation process. An upward movement of individual core rod sections in a direction opposite to the drawing direction is here understood as floating. Floating may arise whenever the currently softened core rod section shows a low weight and a small play in upward direction. This effect leads to a relative absence of core rod material in the drawing bulb, which simultaneously results in a change in the "b/a ratio" of the drawn-off component.

To prevent such a situation, at least one means is provided in the method of the invention for preventing a floating of core rod sections during elongation.

It has turned out to be particularly useful when the means for preventing floating is formed by the necking of the inner bore.

In this case the necking of the inner bore of the cladding tube simultaneously serves as a support for the upper core rod section and as an abutment for preventing floating of a further core rod section arranged underneath the necking, which is located fully underneath the necking in this instance.

In a particularly preferred modification of the method of the invention, the coaxial arrangement comprises an inner cylinder surrounding the core rod, which forms the cladding tube provided with the holding or supporting portion, and an outer cylinder surrounding the inner cylinder.

In this case the inner cylinder is provided with the holding or supporting portion for the upper core rod section, and it comprises a mounting of its own. As a rule, the inner cylinder has a smaller wall thickness than the outer cylinder, which simplifies the formation of the holding or supporting portion, for instance by glass blowing work.

In this context it has turned out to be particularly advantageous when the inner cylinder comprises the necking.

The at least one necking, for instance in the form of an inner bead, can be formed with a comparatively thin-walled inner cylinder more easily and at less costs than in the case of an outer cylinder, which is normally present as a thick-walled hollow cylinder.

Moreover, it has turned out to be advantageous when the upper core rod section is suspended from the holding or supporting portion of the inner cylinder.

As has been described already above, the upper core rod section is therefore provided, for instance, with an outer collar which grips over the face of the inner cylinder. Or at least one holding device is provided which holds the upper core rod section and is supported on the inner cylinder. This holding device is in the simplest case a holding body in the form of a quartz glass pin which extends through the inner cylinder wall and through the core rod.

In another procedure in which the coaxial arrangement comprises an inner cylinder surrounding the core rod and an outer cylinder surrounding the inner cylinder, the outer cylinder forms the cladding tube provided with the holding or supporting portion.

It is not only the weight of the upper core rod section that is carried on the outer cylinder, but also the weight of the inner cylinder, or part thereof.

The core rod is the quartz glass for the core region of the optical component to be produced, the manufacture of which is particularly troublesome in terms of time, material and thus costs. After the core rod has been manufactured, finishing treatments, particularly heat treatments, that may change the optical properties or even lead to loss of the core rod must therefore be avoided as much as possible. In the preferred variant of the method, the upper core rod section can be fixed without any troublesome treatment measures within the inner cylinder by the inner cylinder being made of at least one lower longitudinal segment and one upper longitudinal segment that at is lower end comprises a narrowing inner bore on which the upper core rod section is positioned.

In this procedure, an inner cylinder is provided that, similar to the core rod, consists of loosely superposed longitudinal segments. At least one of said longitudinal segments also serves to hold and fix a core rod section in that its inner bore comprises a necking having an inner diameter that is either smaller than the outer diameter of the core rod section resting on the necking, or that, in the case of an indirect support of the core rod on the necking via an intermediate piece, is smaller than the outer diameter of said intermediate section. The necking of the inner bore can be formed easily in the inner cylinder, which is normally thin-walled. Such a necking of the inner bore is e.g. also suited for the initial fixation of the lowermost core rod section.

The longitudinal segment in question is supported on the holding or supporting portion of the cladding tube (outer cylinder), or it is suspended at said place.

Preferably, the holding or supporting portion is shaped in the form of a necking of the inner bore of the outer cylinder on which the upper longitudinal segment of the inner cylinder rests with its lower end.

In this connection reference is made to the above explanations regarding a corresponding design of the cladding tube in its general form; these are applicable to the configuration of the necking on the outer cylinder in the same way. The formation of the necking particularly on the outer cylinder has the advantage that in the simplest case neither the core rod nor the inner cylinder requires any mechanical treatment or glass blowing work.

In a particularly suitable embodiment, the upper core rod section is fixed in an inner cylinder which at its upper end comprises an outer collar which grips over the holding or supporting portion.

The inner cylinder is either made as one part or it consists of a plurality of longitudinal segments. At any rate, the part of the inner cylinder that surrounds the upper core rod sections comprises an upper end with outer collar which grips over the holding or supporting portion formed on the outer cylinder, for instance in the form of the upper face of the outer cylinder. The upper core section is held in the inner cylinder. Its weight is thus transmitted indirectly via the inner cylinder to the outer cylinder. The upper core rod section is fixed in the inner cylinder, for instance, by way of the above-mentioned measures (necking of the inner bore of the inner cylinder, mounting on or suspension from a support body extending through the inner bore, providing the upper core rod section end with an outer collar gripping over the inner cylinder). The outer collar of the inner cylinder is advantageously configured such that it does not prevent the application and maintenance of a negative pressure in the annular gap between the inner cylinder and the outer cylinder.

At the beginning the lower core rod section must be prevented from falling out of the inner bore of the cladding tube. As soon as the corresponding holding function is no longer required due to softening during the elongation process, the weight of the lower core rod section of the coaxial arrangement (or the remainder) will rest on the drawing bulb.

Preferably, the weight of the lower core rod section is carried at a place other than the holding or supporting portion.

This variant of the method has the advantage that the weights of lower and upper core rod section are carried at different places, so that the corresponding holding elements can be made compact and the risk of breakage due to great weights is reduced.

As an alternative, and equally preferred, the weight of a lower core rod section is carried on the holding or supporting portion.

This variant of the method has the advantage that the number of the holding elements and thus the manufacturing costs for the coaxial arrangement are small.

Moreover, it has turned out to be particularly useful, also as a supplement to all of the variants of the method explained above in more detail, when an intermediate piece of quartz glass on which the upper core rod section is positioned is arranged in the holding or supporting portion of the cladding tube.

In the area around the holding or supporting portion, the geometry of the coaxial arrangement may be irregular in axial direction, and there may arise some kind of deviation from the ideal cylinder symmetry in addition. As a consequence, this portion is not suited for the manufacture of optical high-quality components and is normally rejected. Since the core rod, in particular, consists of high-quality quartz glass, the core rod segment in question is replaced in said portion by a less expensive quartz glass in the form of the intermediate piece. This applies equally to the inner cylinder in an embodiment of the invention where the holding or supporting portion is provided on the outer cylinder. Moreover, the intermediate piece may have a supplementary holding or supporting function for the upper core rod section and assume such a function for the inner cylinder in case of need, thereby simplifying the formation of the holding or supporting portion. An intermediate piece which rests on a necking of the outer cylinder and on which the upper core rod section and the inner cylinder are supported should be mentioned by way of example.

To ensure the application and maintenance of a negative pressure in the inner bore, the intermediate piece is advantageously provided with gas passage openings.

It is true that the method of the invention requires some efforts for the formation of a suitable holding or supporting portion in the cladding tube or a suitable configuration of the upper core rod section. These additional efforts, however, are compensated by an enhanced yield in cases where the cladding tube has a length of more than 4 m. The core rod has a correspondingly large length.

Figure 2:
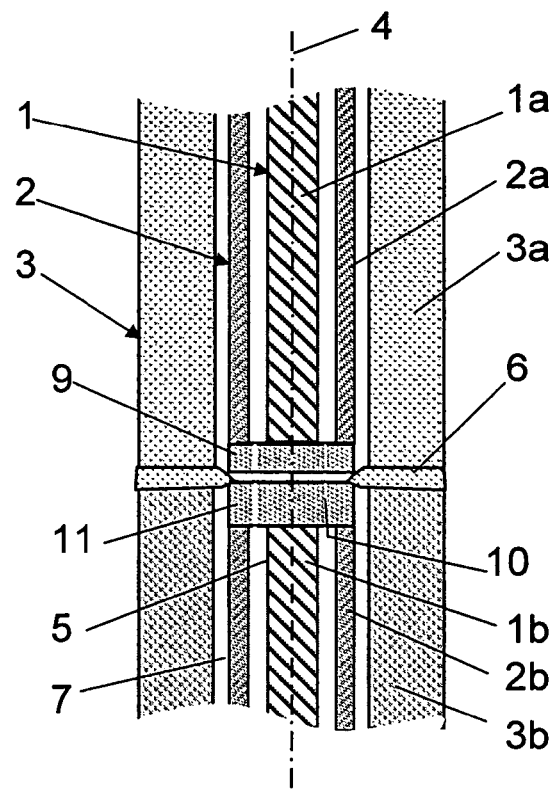
Figure 3:
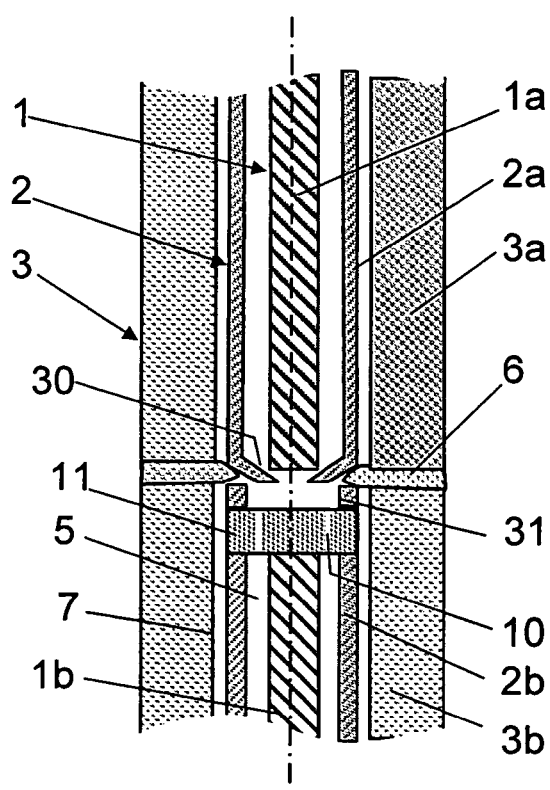
Figure 4:
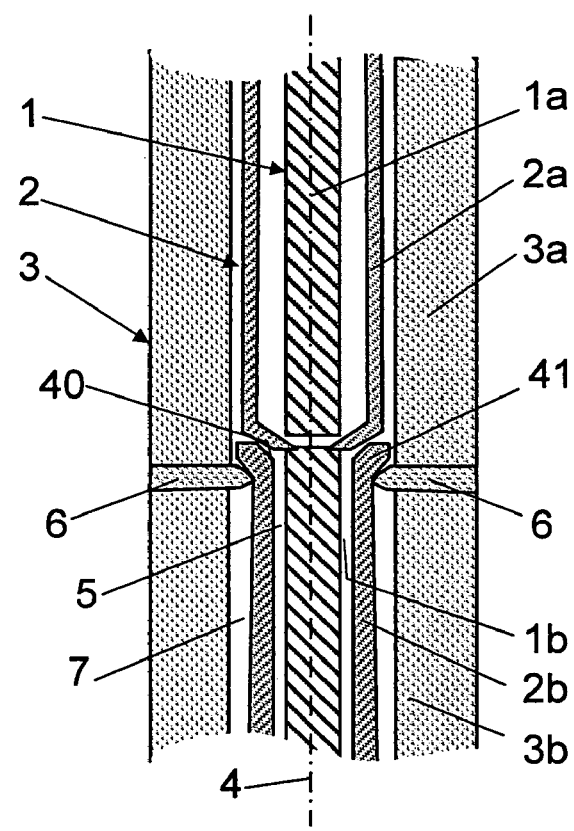
Figure 5:
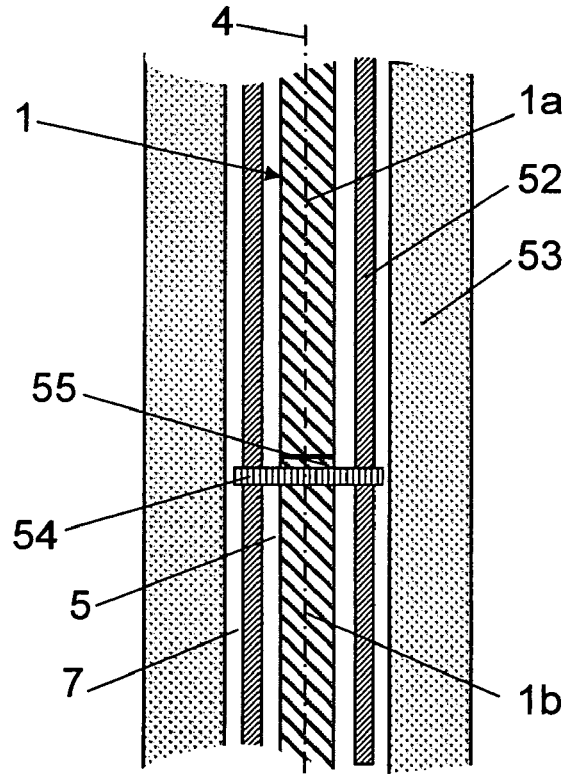
Figure 6:
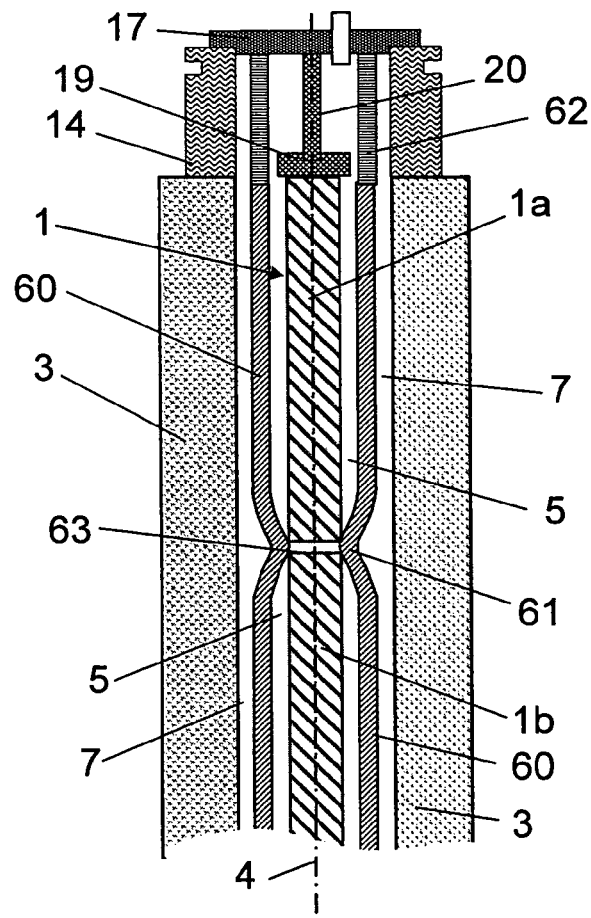
Figure 7:
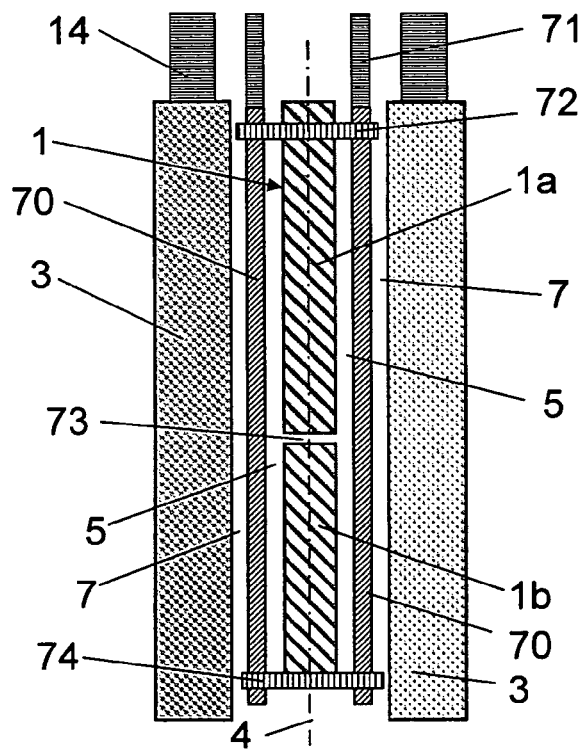

The method according to the invention shall now be explained in more detail with reference to embodiments and a drawing. The drawing is a schematic illustration showing in detail in FIG. 1 an overall view of an embodiment of a coaxial arrangement consisting of core rod, inner jacket tube and outer jacket tube for performing the method of the invention;

FIG. 2 a detailed view of FIG. 1 with an upper core rod section being mounted on an inner bead of the outer jacket tube, on an enlarged scale;

FIG. 3 a first modification of the mounting shown in FIG. 2;

FIG. 4 a further modification of the mounting shown in FIG. 2;

FIG. 5 a supported mounting of the upper core rod section on a lower core rod section which is fixed to a separately held inner jacket tube;

FIG. 6 a further embodiment of the mounting of the upper core rod section in a separately held inner jacket tube; and FIG. 7 an embodiment for mounting the upper core rod section in an inner jacket tube provided with outer collar.

Figure 8:
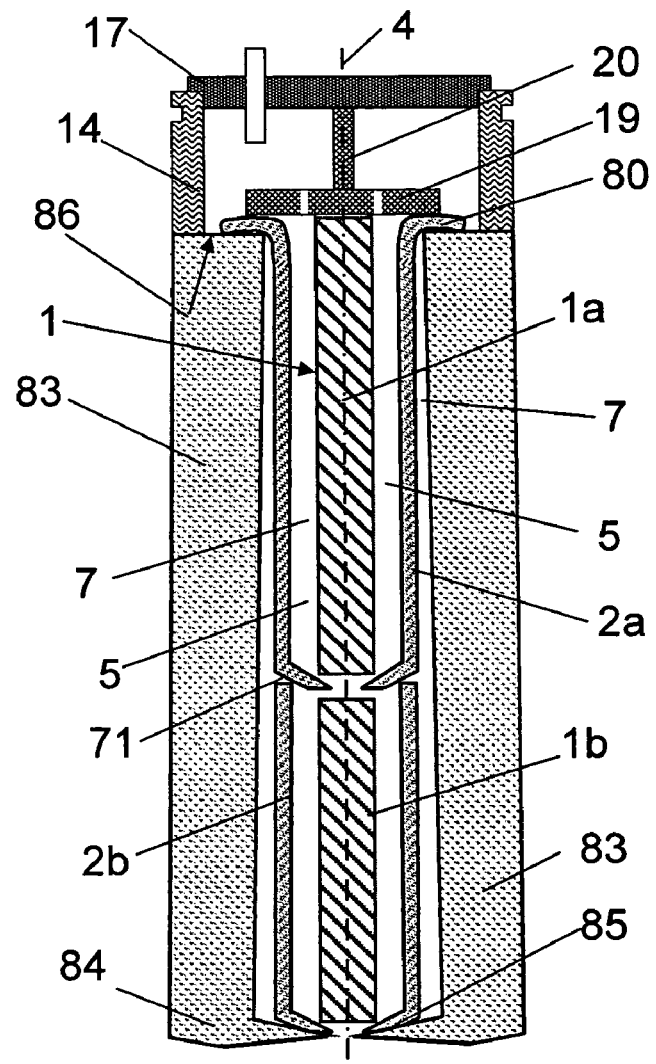

FIG. 8 an embodiment with the upper segment of an inner jacket tube having an upper end with an outer collar.

FIG. 1 shows an arrangement consisting of a core rod 1, an inner jacket tube 2 and an outer jacket tube 3 of quartz glass. The longitudinal axes of said components extend each in a direction coaxial to a vertically oriented central axis 4 of the overall arrangement.

The core rod 1 consists of high-purity synthetic quartz glass and comprises an upper core rod section 1a and a lower core rod section 1b separated therefrom. The core rod sections 1a, 1b are made by depositing $SiO_2$ particles according to the so-called OVD method, each having a core/jacket structure. This means that when viewed in radial direction they have an inhomogeneous refractive index profile. The core rod sections 1a, 1b are loosely stacked one upon the other in spaced-apart relationship in the inner bore of the inner jacket tube 2. The length of the core rod sections is each time about 3 m and their outer diameter is about 38 mm, resulting in an inner annular gap 5 with a gap width of about 1 mm between the jacket tube 2 and the core rod 1.

The inner jacket tube 2 which directly surrounds the core rod 1 consists of high-purity quartz glass obtained by outside deposition according to the so-called OVD method. It comprises an upper segment 2a and a lower segment 2b. The segments are separated from one another in axial direction (central axis 4) in the inner bore of the outer jacket tube 3 and are loosely stacked one upon the other. The lengths of the individual jacket tube segments 2a and 2b, respectively, correspond to those of the core rod sections 1a and 1b, respectively, inserted therein and are thus also about 3 m each in the embodiment. The inner diameter of the jacket tube segments 2a, 2b is 40 mm and their outer diameter is 52 mm.

The outer jacket tube 3 which surrounds the inner jacket tube 2 while leaving an outer annular gap 7 consists of synthetically produced quartz glass. It is composed of two cylinder members 3a, 3b that are butt-welded to one another. At the location of the joint a surrounding bead 6 (hereinafter called "inner bead 6") is formed that extends approximately 3 mm into the outer annular gap 7. The inner bead 6 is formed during welding of the cylinder members 3a, 3b in that the area of the two cylinder members 3a, 3b facing the joint is softened and in that the inner edge of one of the cylinder members is bent inwards with the help of a graphite tool directly before the cylinder members 3a, 3b are pressed together. The outer diameter of the outer jacket tube is 195 mm. In the area of the inner bead 6, the inner diameter is about 48 mm and, otherwise, about 54 mm.

An upper spacer disc 9 of quartz glass that is provided with through holes 10 is directly positioned on the inner bead 6. The upper spacer disc 9 has an outer diameter of 52 mm and a thickness of 20 mm. The through holes 10 extend in a radius around the central axis 4, which radius corresponds approximately to the central radius of the inner annular gap 5. The upper core rod section 1a and the upper jacket tube segment 2a stand on the upper spacer disc 9. Hence, their weight is transmitted via the upper spacer disc 9 to the inner bead 6 and thus to the outer jacket tube 3.

A lower spacer disc 11 of quartz glass having a geometry corresponding to that of the upper spacer disc 9 extends on the bottom side of the inner bead 6. The lower spacer disc 11 is positioned on the upper faces of lower core rod section 1b and lower jacket tube segment 2b. These components are prevented from falling out of the inner bore of the outer jacket tube 3 by means of a quartz glass plate 12 occluding the inner bore, which plate, in turn, is fixed with a pin 13 extending through the plate 12 and at both sides through the wall of the outer jacket tube 3.

A holding cylinder 14 consisting of quartz glass of a minor quality is fused to the upper face end of the outer jacket tube 3. The holding cylinder 14 is provided with a surrounding rectangular groove 15 which serves as a receiver for a gripper (not shown in the figure) by means of which the outer jacket tube 3 is held and moved. The gripper is gimbaled, so that the outer jacket tube 3 is pivotable about the gimbal mounting in a direction transverse to the drawing direction (directional arrow 16), which contributes to a self-centering during the elongation process.

The upper end of the holding cylinder 14 is closed with a lid 17 through which a gas line 18 is passed, via which the inner bore of the outer jacket tube 3 and thus also the inner bore of the inner jacket tube 2 is evacuable, and through which a purging gas can be introduced.

A further quartz glass plate 19 is positioned on the upper faces of upper core rod section 1a and upper jacket tube segment 2a. The quartz glass plate 19 also comprises bores for passing the vacuum therethrough onto the inner bore of the inner jacket tube 2. A support rod 20 which prevents the upper core rod section 1a from floating during the elongation process extends between the quartz glass plate 19 and the lid 17.

Insofar as FIGS. 2 to 8 use the same reference numerals as FIG. 1, these will designate constructionally identical or equivalent components and parts as have been explained above by way of example with reference to the description of the arrangement.

FIG. 2 shows area A of FIG. 1 on an enlarged scale. The outer diameter of the spacer discs 9 and 11 corresponds approximately to that of the inner jacket tube 2, so that the upper and lower segments thereof can be supported on the respective spacer discs 9 and 11. On the other hand, the diameter of the spacer discs 9 and 11 is larger than the inner diameter of the inner bore in the area of the inner bead 6, so that the spacer discs 9 and 11 rest on the inner bead from above and from below, respectively.

FIGS. 3 and 4 show alternative embodiments for fixing the upper core rod section 1a in area A by support on an inner bead 6 of the outer jacket tube 3.

In the embodiment according to FIG. 3, the upper segment 2a of the inner jacket tube 2 is provided with a downwardly conically tapering lower end 30, resulting in a necking of the inner bore of the inner jacket tube 2 with an opening width of about 25 mm. The upper core rod section 1a rests on said necking. One of the spacer discs can here be omitted, which permits a distance between the core rod sections 1a, 1b that is smaller in comparison with the embodiment of FIG. 2. However, the conical lower end 30 of the inner jacket tube 2a may here extend up to a place below the inner bead 6, so that a spacer ring 31 may be useful for preventing contact with the spacer disc 11.

In the embodiment according to FIG. 4, both spacer discs may be omitted. In this case, too, the upper segment 2a of the inner jacket tube 2 is provided with a downwardly conically tapering lower end 40, resulting in a necking 40 of the inner bore 5 of the inner jacket tube 2 with an opening width of about 25 mm, with the upper core rod section 1a resting on said necking. The lower segment 2b of the inner jacket tube 2 comprises an upper end provided with an outwardly oriented collar 41 which grips over the inner bead 6.

In all of the above-described embodiments of the invention, the weight of the upper core rod section 1a and of the upper segment 2a of the inner jacket tube 2 is directly or indirectly carried via the inner bead 6 on the outer jacket tube 3.

To prevent a floating of core rod 1a, 1b and inner jacket tube 50 during the elongation process, a similar device is provided as in the embodiment shown in FIG. 1. Said device comprises a lid 17 which is firmly connected to the holding cylinder 14. A support rod 20 extends between lid 17 and a support disc 19 positioned on the upper core rod section 1a. At least the annular gap 5 is evacuable via a gas line passed through the lid 17.

FIG. 5 shows a similar embodiment of the method of the invention in which, however, the weight of the upper core rod section 1a is carried on the inner jacket tube 2.

The inner jacket tube 52 and the outer jacket tube 53 have each a length of 6 m and are welded together without any visible seam from segments having a length of 3 m. The upper end of the lower core rod section 1b is provided with a through hole through which a quartz glass pin 54 extends by means of which said core rod section 1b is held suspended to be pivotable and displaceable to some extent on the wall of the inner jacket tube 52. The bore of the core rod section 1b can be formed in a cold state (without hot deformation).

The upper core rod section 1a directly rests on the upper face of the lower core rod section 1b. The point of contact is marked in FIG. 5 with reference numeral 55. Spacer discs can here be omitted. The inner jacket tube 52 is held by means of a separate holder (not shown in FIG. 5). To prevent the upper core rod section 1a from floating during the elongation process, a similar device is provided as in the embodiment shown in FIG. 1, wherein the upper core rod section 1a rests on a closure lid via a support disc and a support rod.

FIGS. 6 and 7 schematically show further embodiments of the invention in which the weight of the upper core rod section 1a is carried on the inner jacket tube 2.

In the embodiment according to FIG. 6, outer jacket tube 3 and inner jacket tube 60 are each butt-joined without any visible seam from two segments having a length of 3 m. The inner jacket tube 60 is provided approximately in its center with a taper 61 on which the upper core rod section 1a is positioned. The taper 61 is formed during joining of the jacket tube segments. The lower core rod section 1b extends underneath the taper 61, a narrow gap 63 remaining between the core rod sections 1a, 1b. The inner jacket tube 60 is held by means of a holder 62 of quartz glass (and a gripper acting thereon and having a gimbaled mounting) separately with respect to the outer jacket tube 3. To this end the quartz glass holder 62 is fused to the upper end of the inner jacket tube 60.

In contrast to FIG. 6, the embodiment according to FIG. 7 shows a suspended mounting of the upper core rod section 1a on an inner jacket tube 70. Said tube is also made in one part, without any visible seam, from two joined segments having a length of 3 m, and it is held by means of a holder 71 of quartz glass fused to the upper face thereof (and by means of a gripper acting thereon). The suspended mounting of the upper core rod section 1a is achieved by way of a quartz glass pin 72 which extends at the upper end of the inner jacket tube 70 through the wall thereof and through the upper end of the core rod section 1a. To this end the upper core rod section 1a is provided in a cold state with a fitting bore ensuring some pivotability around the pin axis. The lower core rod section 1b rests on a further quartz glass pin 74 which extends at the lower end of the inner jacket tube 70 through the wall thereof. A small gap 73 remains between the core rod sections 1a, 1b. Vacuum tightness of the inner bore of the inner jacket tube 70 is ensured by the outer jacket tube 3.

In the embodiment of the invention according to FIG. 8, the upper segment 2a of the inner jacket tube has an upper end which is provided with an outer collar 80 which rests on the upper face 86 of the outer jacket tube 83. Furthermore, the lower end of the upper segment 2a of the inner jacket tube is provided with a taper 81 on which the upper core rod section 1a is positioned. The weight of the upper core rod section 1a is thus carried via the inner jacket tube 2 on the upper face 86 of the outer jacket tube 83. A lower core rod section 1b which rests on a necking 85 of a lower jacket tube segment 2b is arranged underneath the upper core rod section 1a. The lower end of the outer jacket tube 83 tapers downwards conically. The lower jacket tube segment 2b rests on said taper 84 together with the lower core rod section 1b fixed therein.

To prevent core rod 1a, 1b and inner jacket tube 2a, 2b from floating during the elongation process, a similar device is provided as in the embodiment shown in FIG. 1. Said device comprises a lid 17 which is firmly melted with the holding cylinder 14 and with the support rod 20. The support rod 20 is supported on a support plate 19 provided with through holes, which is positioned on both the upper core rod section 1a and the outer collar 80. The inner bore of the outer jacket tube 83 is evacuable via a gas line guided through the lid 17.

A procedure which is typical of the method of the invention and is used for producing an optical fiber shall now be explained in more detail with reference to FIG. 1.

The core rod sections 2 are first of all produced according to the OVD method. To this end a soot body is produced on a rotating support by axial deposition of a central $GeO_2$-doped core layer and an undoped $SiO_2$ layer surrounding the same, the soot body being subsequently subjected to a dehydration treatment in a chlorine-containing atmosphere and vitrified in a vitrification furnace at a temperature in the range around 1350° C., so that the core rod 2 is obtained with an outer diameter of 38 mm and the desired refractive index profile. In the optical fiber to be produced, which has an outer diameter of 125 μm, the core of the core rod 1 forms a core region having a diameter of about 8.5 μm.

As an alternative to the above-described production method of the core rods according to the OVD method, these may also be produced according to the known MCVD, VAD, PCVD or FCVD (furnace chemical vapor deposition) method.

Further jacket material for forming the outer cladding glass layers of the fiber is provided in the form of the jacket tubes 2 and 3 which are collapsed onto the core rod 1 directly during fiber drawing. The jacket tube segments 2a, 2b, 3a and 3b are produced with the help of a standard OVD method without addition of a dopant.

The segments 3a and 3b of the outer jacket tube are fused with one another, the inner bead 6 being produced with the help of a molding tool. Moreover, the holder 14 is fused onto the upper end of the outer jacket tube 3.

The inner bore of the outer jacket tube 3 provided with the inner bead 6 is filled from above with the upper spacer disc 9, the upper jacket tube segment 2a and the upper core rod section 1a. The inner bore is subsequently filled from below underneath the inner bead 6 with the corresponding components (11, 2b, 1b and 12), and these are secured by pin 13 such they cannot fall out.

The outer jacket tube 3 is gripped by means of a gripper engaging into the circumferential groove 11, and the whole coaxial arrangement of core rod 1, inner jacket tube 2 and outer jacket tube 3 is subsequently supplied in vertical orientation, starting with the lower end, to an annular furnace, heated therein zonewise to a temperature of around 2050° C. and an optical fiber is drawn off from the softened area in this process. As long as the lower end of the arrangement has not softened and collapsed yet, a purging gas stream of nitrogen is introduced via gas line 18, said stream preventing the penetration of impurities into the inner bore of the outer jacket tube 3.

As soon as the lower portion of the arrangement has collapsed, a negative pressure of about 1000 mbar is produced and maintained in the inner bore of the jacket tubes 2, 3 via the gas line 18. Due to the drawing off of glass mass from the softened area, a drawing bulb is formed at the lower end of the coaxial arrangement. At the beginning of the drawing process, the upper jacket tube segment 2a and the upper core rod section 1a are positioned via the spacer disc 9 on the inner bead 6 and do thus not exert any load on the drawing bulb. The weight of the lower core rod section 2b with a length of 3 m can be taken by the vacuum in the inner bore of the jacket tubes 2, 3.

An optical fiber having an outer diameter of 125 μm is drawn off from the softened and collapsed area of the arrangement. A preform for an optical fiber can also be produced in a similar way.

The invention claimed is:

1. A method for producing an optical component made from quartz glass, said method comprising: supplying in vertical orientation to a heating zone a coaxial arrangement comprising a core rod surrounded by a quartz-glass cladding tube having therein an evacuable inner bore, softening the coaxial arrangement in the heating zone zonewise so as to form a drawing bulb, and elongating the coaxial arrangement to obtain the optical component, wherein the core rod comprises separate upper and lower core rod sections arranged above one another in the inner bore, a lower portion of the upper core rod section rests on a supporting portion of the cladding tube provided above the drawing bulb, said supporting portion being a portion of the cladding tube that extends inward so as to narrow the inner bore.

2. The method according to claim 1, further comprising providing structure for preventing floating of core rod sections during elongation.

3. The method according to claim 2 wherein the structure preventing floating is formed by a necking of the inner bore.

4. The method according to claim 1, wherein the cladding tube comprises an inner cylinder that surrounds the core rod and is provided with the supporting portion, and an outer cylinder which surrounds the inner cylinder.

5. The method according to claim 1, wherein the cladding tube comprises an inner cylinder surrounding the core rod and an outer cylinder surrounding the inner cylinder, and wherein said outer cylinder is provided with the supporting portion.

6. The method according to claim 5, wherein the outer cylinder has an inner bore and the supporting portion is formed in the shape of a necking of the inner bore of the outer cylinder on which the inner cylinder is positioned with the lower end thereof.

7. The method according to claim 1, wherein an intermediate piece of quartz glass is arranged inside the cladding tube in an area of the supporting portion.

8. The method according to claim 7, wherein the intermediate piece is provided with gas passage openings.

9. The method according to claim 1, wherein the cladding tube has a length of more than 4 m.

10. A method for producing an optical component made from quartz glass, said method comprising: supplying in vertical orientation to a heating zone a coaxial arrangement comprising a core rod surrounded by a quartz-glass cladding tube having therein an evacuable inner bore, softening the coaxial arrangement in the heating zone zonewise so as to form a drawing bulb, and elongating the coaxial arrangement to obtain the optical component, wherein the core rod comprises separate upper and lower core rod sections arranged above one another in the inner bore, a lower portion of the upper core rod section rests on a supporting portion of the cladding tube provided above the drawing bulb, wherein the supporting portion is shaped in the form of a necking of the inner bore of the cladding tube, and the upper core rod section rests on the necking of the inner bore.

11. The method according to claim 10, wherein the necking is configured as a surrounding inner bead of the cladding tube.

12. The method according to claim 10 wherein the cladding tube is produced by butt welding tube sections, the necking being simultaneously formed in an area of a joint during the welding.

13. The method according to claim 10, further comprising providing structure for preventing floating of core rod sections during elongation.

14. The method according to claim 13 wherein the structure preventing floating is formed by a necking of the inner bore.

15. The method according to claim 10, wherein the cladding tube comprises an inner cylinder that surrounds the core rod and is provided with the supporting portion, and an outer cylinder which surrounds the inner cylinder.

16. The method according to claim 10, wherein an intermediate piece of quartz glass is arranged inside the cladding tube in an area of the supporting portion.

17. The method according to claim 16, wherein the intermediate piece is provided with gas passage openings.

18. A method for producing an optical component made from quartz glass, said method comprising: supplying in vertical orientation to a heating zone a coaxial arrangement comprising a core rod surrounded by a quartz-glass cladding tube having therein an evacuable inner bore, softening the coaxial arrangement in the heating zone zonewise so as to form a drawing bulb, and elongating the coaxial arrangement to obtain the optical component, wherein the core rod comprises separate upper and lower core rod sections arranged above one another in the inner bore, a lower portion of the upper core rod section rests on a supporting portion of the cladding tube provided above the drawing bulb, wherein the cladding tube comprises an inner cylinder that surrounds the core rod and is provided with the supporting portion, and an outer cylinder which surrounds the inner cylinder, and wherein the supporting portion is formed as a necking of the inner bore of the inner cylinder.

19. A method for producing an optical component made from quartz glass, said method comprising: supplying in vertical orientation to a heating zone a coaxial arrangement comprising a core rod surrounded by a quartz-glass cladding tube having therein an evacuable inner bore, softening the coaxial arrangement in the heating zone zonewise so as to form a drawing bulb, and elongating the coaxial arrangement to obtain the optical component, wherein the core rod comprises separate upper and lower core rod sections arranged above one another in the inner bore, a lower portion of the upper core rod section rests on a supporting portion of the cladding tube provided above the drawing bulb, wherein the upper and lower core rod sections define a space therebetween separating said upper and lower core rod sections.

* * * * *